United States Patent
Hieke et al.

(10) Patent No.: US 10,633,869 B2
(45) Date of Patent: Apr. 28, 2020

(54) COMPOSITE MATERIALS WITH TAILORED ELECTROMAGNETIC SPECTRAL PROPERTIES, STRUCTURAL ELEMENTS FOR ENHANCED THERMAL MANAGEMENT, AND METHODS FOR MANUFACTURING THEREOF

(71) Applicants: Andreas Hieke, San Mateo, CA (US); William Boone Daniels, II, Marikina (PH)

(72) Inventors: Andreas Hieke, San Mateo, CA (US); William Boone Daniels, II, Marikina (PH)

(*) Notice: Subject to any disclaimer, the term of this patent is extended or adjusted under 35 U.S.C. 154(b) by 0 days.

(21) Appl. No.: 16/387,206

(22) Filed: Apr. 17, 2019

(65) Prior Publication Data

US 2019/0277036 A1 Sep. 12, 2019

Related U.S. Application Data

(63) Continuation of application No. 14/831,813, filed on Aug. 20, 2015, now Pat. No. 10,280,626.

(Continued)

(51) Int. Cl.
*E04F 13/00* (2006.01)
*C09D 5/00* (2006.01)
(Continued)

(52) U.S. Cl.
CPC ............. *E04F 13/02* (2013.01); *C04B 26/06* (2013.01); *C04B 26/08* (2013.01); *C04B 26/12* (2013.01);
(Continued)

(58) Field of Classification Search
CPC .... H01B 1/00; H01B 1/14; H01B 1/20; E04F 13/00; E04F 13/02; C04B 26/02;
(Continued)

(56) References Cited

U.S. PATENT DOCUMENTS 3,897,820 A 8/1975 Teeter
3,948,314 A 4/1976 Creswick et al.
(Continued)

FOREIGN PATENT DOCUMENTS

WO WO 2017/002295 1/2017

OTHER PUBLICATIONS

Berdahl, P.;Three-year weathering tests on asphalt shingles: Solar reflectance; Solar Energy Materials & Solar Cells 99 (2012) pp. 277-281.
(Continued)

*Primary Examiner* — Mark Kopec
(74) *Attorney, Agent, or Firm* — Knobbe, Martens, Olson & Bear, LLP

(57) ABSTRACT

Disclosed is a method to produce composite materials, which contain customized mixes of nano- and/or micro-particles with tailored electromagnetic spectral properties, structural elements based thereon, in particular layers, but also bulk materials including inhomogeneous bulk materials. In some embodiments the IR-reflectivity is enhanced predominantly independently of reflectivity for visible wavelength. The enhanced IR-reflectivity is achieved by combining spectral properties from a plurality of nano- and/or micro-particles of distinct size distribution, shape distribution, chemical composition, crystal structure, and crystallinity distribution. This enables to approximate desired target spectra better than know solutions, which comprise only a single type of particles and/or an uncontrolled natural size distribution. Furthermore disclosed are methods of manufacturing such materials, including ceramics, clay, and concrete, as well as applications related to design and construction of buildings or other confined spaces.

26 Claims, 6 Drawing Sheets

Related U.S. Application Data

(60) Provisional application No. 62/041,303, filed on Aug. 25, 2014.

(51) Int. Cl.

| | | |
|---|---|---|
| *C04B 26/00* | (2006.01) | |
| *E04F 13/02* | (2006.01) | |
| *C04B 26/06* | (2006.01) | |
| *C04B 26/08* | (2006.01) | |
| *C04B 26/12* | (2006.01) | |
| *C04B 26/16* | (2006.01) | |
| *C09D 5/03* | (2006.01) | |
| *H01B 1/20* | (2006.01) | |
| *E04B 1/76* | (2006.01) | |
| *C04B 111/00* | (2006.01) | |
| *C04B 111/28* | (2006.01) | |

(52) U.S. Cl.
CPC .............. *C04B 26/16* (2013.01); *C09D 5/032* (2013.01); *H01B 1/20* (2013.01); *C04B 2111/00008* (2013.01); *C04B 2111/00258* (2013.01); *C04B 2111/00482* (2013.01); *C04B 2111/28* (2013.01); *E04B 2001/7691* (2013.01)

(58) Field of Classification Search
CPC ......... C04B 26/08; C04B 26/12; C09D 5/004; C09D 5/006; C09D 5/032; C09D 5/29; C09D 7/66
USPC ........................................................ 252/500
See application file for complete search history.

(56) References Cited

U.S. PATENT DOCUMENTS

| | | | |
|---|---|---|---|
| 4,212,289 | A | 7/1980 | Hebert |
| 4,235,048 | A | 11/1980 | Gillery |
| 4,249,340 | A | 2/1981 | Maes, Jr. |
| 4,290,416 | A | 9/1981 | Maloney |
| 4,337,754 | A | 7/1982 | Conger |
| 4,408,596 | A | 10/1983 | Worf |
| 4,596,093 | A | 6/1986 | Esposito |
| 5,314,027 | A | 5/1994 | Wood |
| 5,675,487 | A | 10/1997 | Patterson et al. |
| 6,220,339 | B1 | 4/2001 | Krecke |
| 6,632,516 | B2 | 10/2003 | Aanestad |
| 6,786,056 | B2 | 9/2004 | Bash et al. |
| 7,434,577 | B2 | 10/2008 | Doherty |
| 7,610,910 | B2 | 11/2009 | Ahmed |
| 8,007,898 | B2 | 8/2011 | Bailey et al. |
| 8,248,256 | B1 | 8/2012 | Gerardi et al. |
| 8,289,160 | B1 | 10/2012 | Billman |
| 8,689,490 | B2 | 4/2014 | Sumner |
| 9,303,930 | B2 | 4/2016 | Ishizaka |
| 9,639,072 | B2 | 5/2017 | Burke |
| 10,280,626 | B2 | 5/2019 | Hieke et al. |
| 2007/0019199 | A1* | 1/2007 | Palmer ............... G01N 21/4738 356/446 |
| 2007/0199562 | A1 | 8/2007 | Doherty |
| 2008/0000151 | A1 | 1/2008 | Houweling et al. |
| 2008/0014857 | A1 | 1/2008 | Spadafora et al. |
| 2008/0241262 | A1* | 10/2008 | Lee ...................... A61K 9/0009 424/490 |
| 2009/0013596 | A1 | 1/2009 | Wang |
| 2010/0170497 | A1 | 7/2010 | Glynn |
| 2011/0111147 | A1* | 5/2011 | Agrawal ................. C03C 17/23 428/34 |
| 2011/0223850 | A1 | 9/2011 | Narayanamurthy et al. |
| 2012/0072032 | A1 | 3/2012 | Powell et al. |
| 2012/0079833 | A1 | 4/2012 | Rowe |
| 2012/0087085 | A1 | 4/2012 | Moore et al. |
| 2012/0325126 | A1 | 12/2012 | Tran et al. |
| 2013/0192131 | A1 | 8/2013 | Abahusayn |
| 2013/0193005 | A1 | 8/2013 | Hoeth |
| 2013/0199772 | A1 | 8/2013 | Fischer et al. |
| 2013/0340969 | A1 | 12/2013 | Vollen et al. |
| 2014/0277765 | A1 | 9/2014 | Karimi et al. |
| 2014/0339316 | A1 | 11/2014 | Barooah et al. |
| 2015/0237812 | A1 | 8/2015 | Gupta |
| 2015/0253401 | A1 | 9/2015 | Rapoport |
| 2015/0330923 | A1 | 11/2015 | Smullin |
| 2016/0053481 | A1 | 2/2016 | Hieke et al. |
| 2016/0261116 | A1 | 9/2016 | Barooah et al. |
| 2016/0320073 | A1 | 11/2016 | Hieke et al. |
| 2016/0320080 | A1 | 11/2016 | Hieke et al. |
| 2017/0059187 | A1 | 3/2017 | Smith |
| 2017/0192442 | A1 | 7/2017 | Hieke et al. |
| 2017/0205105 | A1 | 7/2017 | Adam et al. |
| 2017/0211829 | A1 | 7/2017 | Slack et al. |
| 2018/0252423 | A1 | 9/2018 | Hieke et al. |
| 2018/0252424 | A1 | 9/2018 | Hieke et al. |
| 2018/0252426 | A1 | 9/2018 | Hieke et al. |
| 2018/0252427 | A1 | 9/2018 | Hieke et al. |
| 2019/0301169 | A1 | 10/2019 | Daniels, II et al. |

OTHER PUBLICATIONS

Chung W., "Review of Building Energy-use Performance Benchmarking Methodologies", Appl Energy (2011) 88: 1470-1479.

European Union/Parliament, Directive on Energy Efficiency of the Council on Oct. 25, 2012; amending Directives 2009/125/EC and 2010/30/EU and repealing Directives 2004/8/EC and 2006/32/EC; printed in the Official Journal of the EU on Nov. 14, 2012; 65 pages.

Goswami et al., [Eds.] Energy Management and Conservation Handbook, CRC Press, Taylor & Francis Group, (2007); ISBN 978-4200-4429-4; TOC, 16 Pages.

Haynes W.M. [Ed.], CRC Handbook of Chemistry and Physics, 93rd Edition CRC Press (2012), Taylor & Francis Group, ISBN 978-1-439-8049-4; TOC, 9 pages.

Horvath H., "Gustav Mie and the scattering and absorption of light by particles: Historic developments and basics", J Quantit Spectros Radiative Transfer (2009) 110: 787-799.

International Energy Agency. Key World Energy Statistics. OECD/IEA (2012); Free Publications; 34 pages.

Joos G. [Ed.] Theoretical Physics 3rd Edition; Dover Publications Inc., New York, (1986), ISBN 0-486-65227-0; TOC, 19 pages.

Kreith F. [Ed.] The CRC Handbook of Thermal Engineering; Boca Raton: CRC Press LLC, (2000); 1183 pages. [uploaded in 2 parts].

Mie, Gustav, Contributions to the optics of diffuse media, specifically colloidal metallic suspensions, Annalen der Physik, 4th series, vol. 25 (1908) No. 3, pp. 377-445.

National Renewable Energy Laboratory (NREL), http://www.nrel.gov; Home Page; downloaded Aug. 18, 2015; 3 pages.

National Solar Radiation Resource Data Products, http://www.nrel.gov/rrede/ downloaded Jun. 16, 2016; 2 pages.

Santamouris, M; Cooling the cities—A review of reflective and green roof mitigation technologies to fight heat island and improve comfort in urban environments, Solar Energy 103 (2014) 682-703, http://dx.doi.org/10.1016/j.solener.2012.07.003.

Shi, Z. et al; Analyzing the effect of the longwave emissivity and solar reflectance of building envelopes on energy-saving in buildings in various climates, Solar Energy 85 (2011) 28-37, http://dx.doi.org/10.1016/j.solener.2010.11.009.

UNEP Sustainable Buildings & Climate Initiative, "Buildings and Climate Change", Summary for Decision-Makers; (2009); 61 pages.

Wikipedia—"Mie Scattering"; downloaded Jul. 19, 2018 in 9 pages.

Wikipedia—"Rayleigh Scattering"; downloaded Jul. 19, 2018 in 6 pages.

\* cited by examiner

COMPOSITE MATERIALS WITH TAILORED ELECTROMAGNETIC SPECTRAL PROPERTIES, STRUCTURAL ELEMENTS FOR ENHANCED THERMAL MANAGEMENT, AND METHODS FOR MANUFACTURING THEREOF

This application is a CON of Ser. No. 14/831,813 (filed Aug. 20, 2015, now U.S. Pat. No. 10,280,626), which application claims priority to U.S. 62/041,303 (filed Aug. 25, 2014).

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The invention relates to methods of creating composite materials with tailored spectral properties in the visible and invisible electromagnetic (EM) wave spectrum using a plurality of discrete populations of nano- and/or micro particles and/or nano- and/or micro cavities.

In some embodiments the invention relates to structural elements, which enable the design and construction of buildings or other confined spaces with improved thermal and energetic properties. In particular, the invention enables the construction of buildings, which absorb less solar radiation per given surface area. This results in lower temperatures inside buildings or other confined spaces, increased time to reach higher temperatures inside such buildings or predominantly confined spaces, and/or in reduced power requirements for air-conditioning systems.

Description of the Related Art

Many technical applications require to control the temperature inside predominantly enclosed spaces or, as a related aspect, the control the electromagnetic spectral properties of materials and surfaces. In some instances it may be desirable to keep the temperature inside predominantly enclosed spaces low, or even as low as possible, whereas in other applications the opposite may be the case. In yet other instances, for example related to achieving broadband camouflage effects, the electromagnetic spectral "appearance" may be of primary interest.

The broadband electromagnetic spectral properties of surface materials (within a certain wavelength range) can affect:
  (a) how a material/surface visually appears,
  (b) how readily visible and invisible electromagnetic radiation is absorbed from a surface and thus gets converted into thermal energy, and
  (c) how rapidly a surface can lose thermal energy by emitting electromagnetic waves at thermal wavelength.

The invention relates in particular to the design and manufacturing of composite materials, which have tailored and improved Ultraviolet (UV), visible (VIS), Near Infrared (NIR), Mid Infrared (MIR), and Far Infrared (FIR) properties, by containing tailored mixtures of nano- and micro particles. Henceforth the term 'light' shall be understood to apply for all of these spectral ranges, not only the portion visible to humans.

Embodiments herein may be described within the context of a range of electromagnetic frequencies ranging from UV to FIR, since these are of increased importance for visual appearance, thermal management, and camouflage. However, the invention should not be limited to these frequencies, as similar arguments can be made for other electromagnetic frequencies.

Thermal management of predominantly enclosed spaces, including buildings, can be a problem in geographic locations with relatively high levels of solar radiation, specifically in conjunction with high energy cost, which makes in some countries the use of permanent air-conditioning financially problematic for a significant segment of the population.

A considerable portion of the energy, which contributes to indoor temperatures, is the result of absorbed solar radiation by the building envelope. This effect can be true in tropical and subtropical regions, but it also applies in moderate climate zones, for example, during summer or times of increased relative temperature (e.g., in North America, Central and Southern Europe).

Related problems apply also to predominantly open spaces, such as large cities and densely populated areas in tropical and subtropical regions, where concrete and asphalt surfaces can significantly contribute to the common "heat island" effect in such areas.

Thus, reducing the amount of solar radiation, which is absorbed by the surface elements of predominantly enclosed spaces, including buildings, can contribute to reducing indoor temperature and/or reduce the required power for air-conditioning. Furthermore, widespread application of such advanced passive cooling methods can contribute to mitigate the heat island phenomena observed in large cities.

In some embodiments the disclosed invention can serve to fabricate materials and surfaces, which enable to control to a very high degree independently the spectral behavior in the VIS range and NIR range, i.e., optical color and NIR "color".

In other embodiments of the disclosed invention, such as inside solar-thermal collectors, the exact opposite is the case: Here the target is to maximize the wavelength range and efficiency of conversions of solar radiation into thermal energy.

In yet other embodiments the disclosed invention, a goal is to achieve a close spectral match of surfaces against a given background, i.e. to "blend in" with the environment, preferable over a wide spectral range. Such effects are desirable in defense-related applications, for example surfaces of buildings (bunkers) or combat vehicles, to avoid, delay, or complicate optical, NIR, IR, or FIR (i.e., thermal) detection, including by ground-, air-, or space-based long-range multi-spectral imaging systems.

SUMMARY OF THE INVENTION

For purposes of summarizing the invention and the advantages achieved over the prior art, certain objects and advantages of the invention have been described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

In an embodiment, a method of creating a composite material is provided. The composite material includes a plurality of populations of nano- or micro-particles and/or of nano- or micro-cavities of predominantly distinct size distributions, shape distributions, chemical compositions, crystal structures, and crystallinity distributions. The plurality of populations are predominantly embedded in a carrier material, in such composition ratios, with such typical properties per population, and in such density relative to the carrier material, that a specific targeted broadband spectral reflectance at least within the VIS and NIR range is approximated, which is at least partially different from the spectral properties of each individual population within the plurality of populations and the carrier.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

A brief description of the drawings shall serve to summarize some principles of the disclosed invention.

In particular, the composition of said plurality of populations of nano- or micro-particles and/or of nano- or micro-cavities is determined by performing an optimization loop in a high-dimensional space comprising at least taking portions of relative amounts $c_i$ [0,1] from a plurality of reservoirs $R_i$ corresponding to a plurality of said populations of nano- or micro-particles, mixing said portions, and embedding said mixture of said nano- or micro-particles in a carrier material thereby creating a composite. An amount of said composite material is made with sufficiently large surface to determining its broadband spectral properties at least within VIS and NIR. Subsequently an optimization algorithm determines a composition vector $_j c$ of a mixture of said nano- or micro-particles taken from each reservoir $R_i$ during a next iterative step j. The process is repeated until a criterion, which is a measure for the degree with which the spectrum obtained from the composite produced during the last iteration does match the target spectrum, has been reached or surpassed. Subsequently larger quantities of said composite are produced for various applications.

Figure 5:
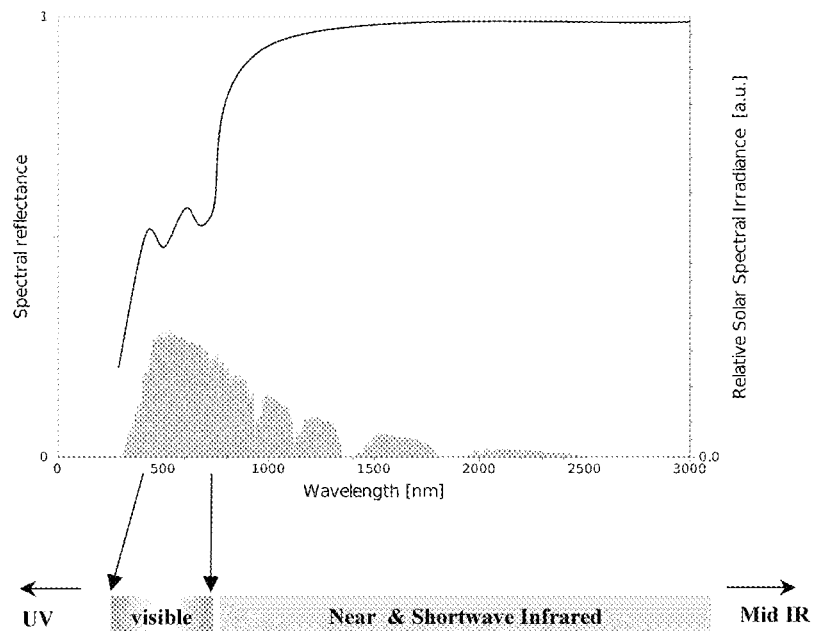

FIG. 5 illustrates schematically the spectral reflectance of a typical composite material, which can be produced with the disclosed method. In this particular example the composite material has a specific visual (non-white) color and a very high NIR reflectance. The result is that most of the solar radiation in the NIR spectrum does not get converted to thermal energy.

Figure 6:
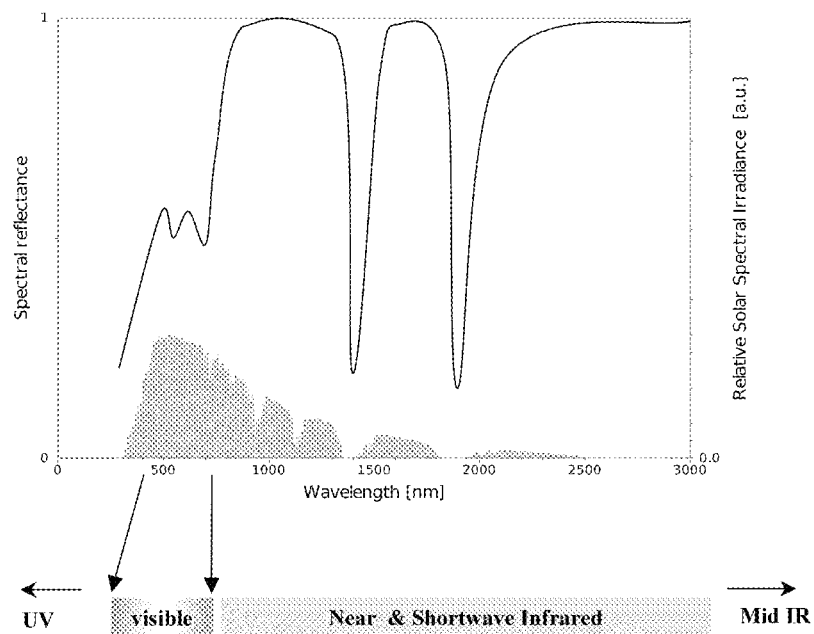

FIG. 6 illustrates schematically the spectral reflectance of a typical composite material, which can be produced with the disclosed method. In this particular example the composite material has a specific visual (non-white) color. The NIR reflectance is very high in certain regions of the NIR range but exhibits imperfections, i.e. drops at certain narrow wavelength rages. This may be caused by the specific available selection and the types of populations of nano- or micro-particles, which does not allow to produce completely even broadband NIR high reflectance. However, the disclosed method was in this particular example still able to generate a useful material with increased, or nearly perfect properties since the imperfections (reflectance drops) coincide with the spectral gaps in the natural solar NIR spectrum typically arriving on the surface of earth. Thus, still most of the solar radiation in the NIR spectrum does not get converted to thermal energy.

DETAILED DESCRIPTION

Solar radiation, which arrives at the surface of the earth, has a peculiar spectral distribution. This is the result of the spectral distribution of the radiation emitted by the sun, which arrives at the outer edge of the atmosphere (in first order Black-body radiation following Planck's law) and the spectrally selective distribution of scattering and absorption within the earth' atmosphere.

The electromagnetic spectrum can conceptually be divided in Ultraviolet (UV), visible (VIS), Near Infrared (NIR) [0.7 μm–3.0 μm], Mid Infrared (MIR) [3 μm–50 μm], and Far Infrared (MIR) [50 μm to 1 mm]. The exact definition of the boundaries of NIR, MIR, and FIR are somewhat arbitrary and different values are used by different scientific communities. (For example, sometimes the NIR range is defined smaller and an additional Short Wavelength IR SWIR is defined.) For physical reasons (the corresponding black body temperatures) we will henceforth follow the values given above.

Figure 1:
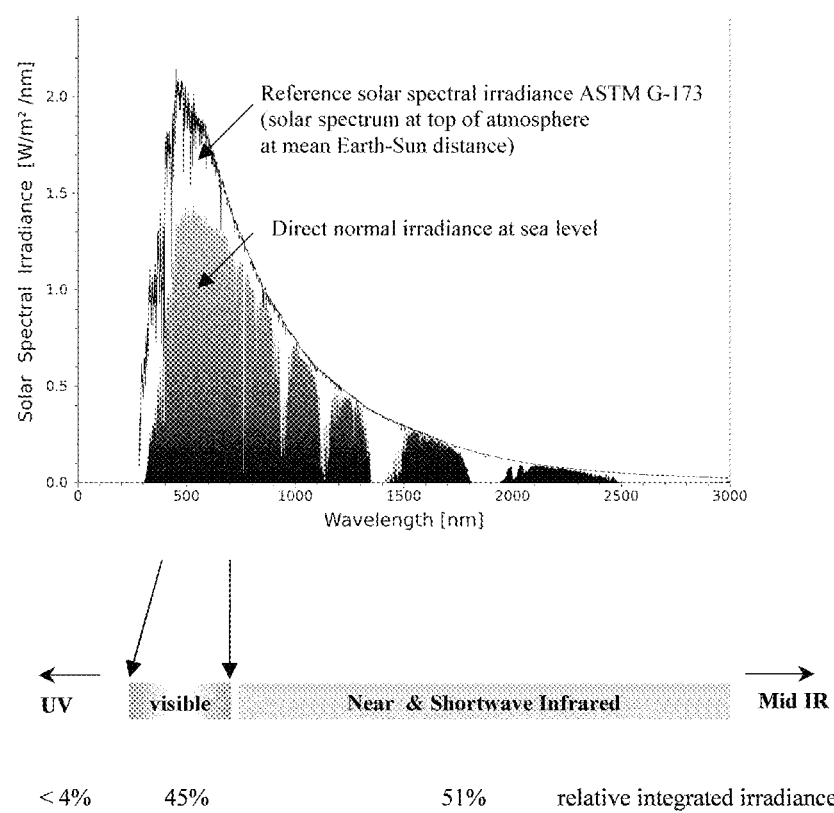
FIG. 1 illustrates the average solar spectrum, which arrives at the average distance between the sun and the earth (i.e., at the outer edge of the atmosphere) as well as maximum average normal irradiance at sea level. More than 50% of the power of the solar radiation is contained within the NIR region.

As illustrated in FIG. 1, most of the solar irradiance (radiation power density) is contained in the wavelength range between 0.25 μm and 3.0 μm. This Figure is based on the reference solar spectral irradiance ASTM G-173. (Additional information regarding spectral properties of solar energy can be found, for example, at the National Renewable Energy Laboratory (NREL) website and www.nrel.gov.) Integrated over the entire spectral range, the irradiance (power density of the radiation), which arrives from the sun at the average distance between the sun and the earth (i.e., at the outer edge of the atmosphere) is approximately 1.36 kW/m². Determined by the chemical composition and density of the air and furthermore influenced by humidity (incl. clouds), dust, pollution levels, latitude, time of day, date, etc., the solar radiation is attenuated while passing through the atmosphere and the spectrum is filtered (some bands are suppressed). This is also illustrated in FIG. 1. Under best-case conditions, the peak levels of the irradiance at sea level is about 900 W/m².

As a reference, in the southwest of the United States, the average energy density per day on a horizontal plate is about 5 to 6 kWh/m²/day on a horizontal plate and >9 kWh/m²/day on a surface, which is 2-axis tracking to remain normal to the incidence (Source: National Solar Radiation Data Base).

The part of the spectrum, which is visible (VIS) to humans, is approximately within the wavelength range between 380 nm and 700 nm. While this visible range corresponds to portion of the spectrum with the highest irradiance, it contains only approximately 45% of the solar power, which arrives at the surface of the earth. The Ultraviolet (UV) portion contains only about <4%, but the range between 750 nm and 2.5 μm, which is within the NIR range, contains about 51% of the solar irradiance. (The ratios are good approximates. More precise values depend on numerous other parameters.)

In order to minimize the temperature increase of an object, which is exposed to (sun)light, ideally all of the incident power should be reflected by its surfaces. Clearly, the best performance, i.e., the least relative amount of absorbed power (i.e., the ratio of absorbed power to arriving radiation power), would be expected from a material or a coating, which acts as a broadband reflector, i.e. is highly reflective in UV, visible, and IR (incl. NIR, MIR, FIR), essentially a broadband mirror or at least a diffusely reflecting broadband "white". Achieving such superior broadband reflectivity constitutes one embodiment of the disclosed invention. Such broadband white or "super-cool" surfaces may be particularly desirable in tropical and or subtropical regions but also e.g. in the southwest of the United States.

In some instance, however, building codes may impose constraints on usable (visual) color of buildings, or certain colors are preferred for esthetic reasons.

Thus, in another embodiment of the disclosed invention, materials are created whereby one is able to control, predominantly independently, the reflectivity of a surface in both the VIS and NIR parts of the spectrum, thus one can at least partially independently control the optical appearance and the IR "appearance".

Figure 2:
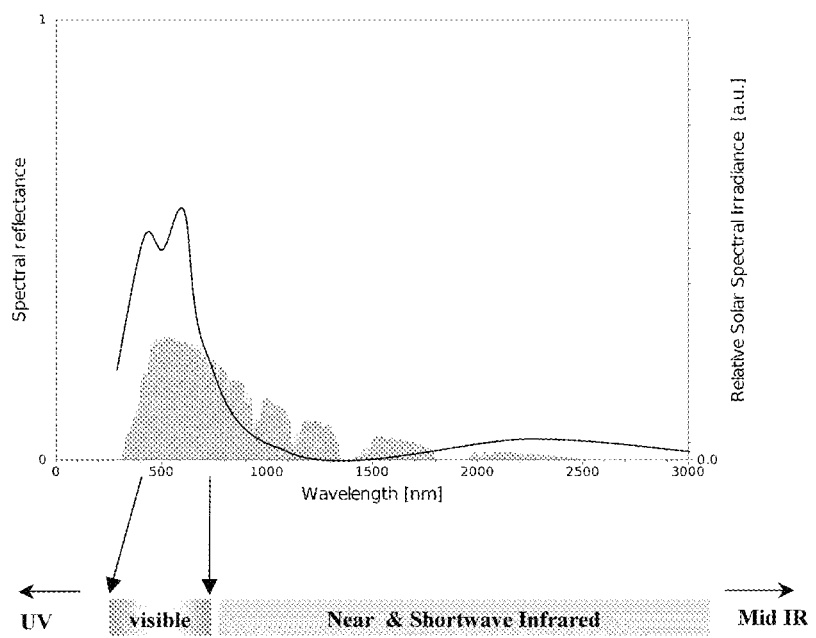
FIG. 2 illustrates schematically the spectral reflectance of a typical material used to coat surfaces in order to achieve a certain color and/or sealing against the water. While clearly a certain visual appearance is achieved, the material exhibits increased spectral absorption (decreased reflectance) in the NIR range resulting in a relatively large amount of solar radiation, which is converted to thermal energy.
Figure 3:
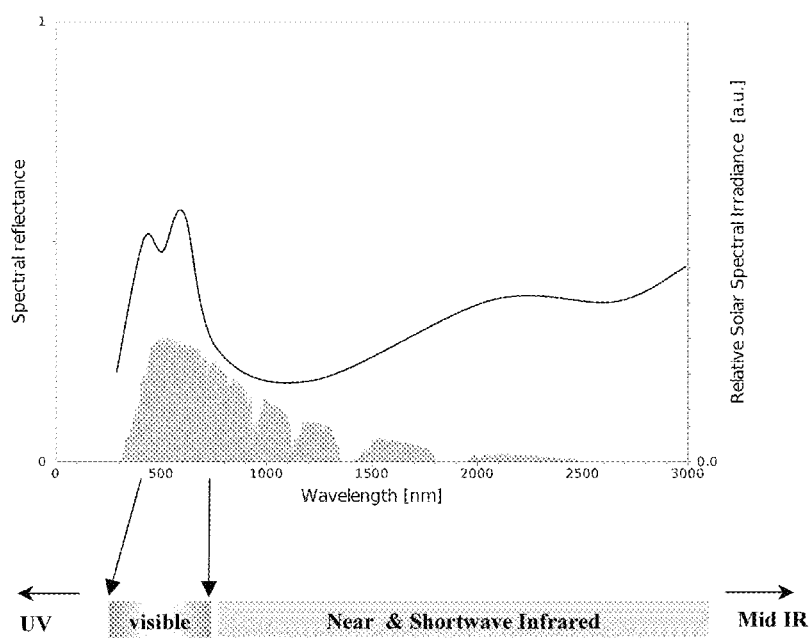
FIG. 3 illustrates schematically the spectral reflectance of a typical material with somewhat improved NIR properties resulting from relatively rudimentary approaches to address this problem. Sometimes these materials are partially marketed as "cool products" (tiles, paints etc.). However, such other approaches typically utilize embedded particles with random or at best weakly controlled and broad size distribution. The result is that still a substantial portion of the solar radiation gets converted to thermal energy.

Most conventional materials, such as those used for buildings, as well as regular paints, have considerable NIR absorption as illustrated in FIG. 2. However, as pointed out above, at least half of the solar power is contained in the NIR spectrum. Thus, optimizing the reflectivity in the NIR region has the potential to reduce the absorbed solar power to at least 50%, even for surfaces, which (as the most extreme) visually appear to be black.

Relatively rudimentary approaches to address this problem have been reported and are partially marketed as "cool products" (tiles, paints etc.). However, such earlier approaches typically utilize embedded particles with a random size distribution or at best a weakly controlled and broad distribution.

Usually powders of various metal oxides (e.g. $TiO_2$, $YMnO_3$, $Al_2O_3$) or semiconductor oxides such as $SiO_2$ are used, but the size distributions of the particles is not or not well known, or varies depending on the fabrication batch, or the location from which they were collected, and is thus in general not well suited for the indented purpose. The consequence is, that some moderate improvements in the NIR reflectance can be achieved, but the typical results are far from optimal, reaching reflectance values of only around 0.4, but often even considerably less.

Thus, the disclosed invention enables substantial additional improvements in achieving desired spectral properties of material, e.g. high NIR reflectance, if the size distribution of the embedded nano- and/or microparticles is intentionally tailored.

In the most general sense the "color" of a surface, i.e., its broadband spectral reflection and absorption, is the result of its chemical composition and, if present, of the size of contained particles and/or cavities, if they are within a certain size ratio compared to the wavelength.

More precisely, the spectral properties depend on the electronic structure (energy levels and energy bands of electrons, including any band gaps) as well the microscopic (on the scale of the wavelength) distribution of the refractive index n. The refractive index can be derived from the material's macroscopic relative permittivity $\varepsilon r$, and its relative permeability $\mu_r$, according to $n=(\varepsilon r \cdot \mu r)^{0.5}$. At optical frequencies most naturally occurring materials have a $\mu_r$ very close to 1, thus the refractive index is proximately $n \approx \varepsilon r^{0.5}$. Relative permittivity is a measure for electric polarizability, again as a result of specific electronic configurations. Thus, ultimately, n can also be reduced to variations in the distribution of the electron density and polarizability. (Which is why embedded cavities can have effect on the spectral properties.)

Naturally occurring or synthesized chemicals, i.e. molecules, which are used as dies, have such electronic structures (energy levels), which cause highly specific selective absorption of optical wavelength, and thus produce the distinct optical appearance (color).

However, the precise theoretical and/or numerical prediction of spectral properties (at any wavelength range) of arbitrary materials {i.e. any number of chemicals, in arbitrary abundance ratios, and with arbitrary particle size (distribution) and shape (distribution), level of crystallinity, potentially embedded in any other combination of materials} is extremely difficult.

As the most basic case, already more than 100 years ago special solution to Maxwell's equations obtained by Gustav Mie enabled to estimate the (elastic) electromagnetic scattering behavior of small gold particles (as reasonable approximation of so-called perfectly conducting PEC spheres) in solution (water), under the assumptions that (a) the particles are spherical and (b) sufficiently sparsely distributed to consider their scattering behavior independent of each other. (Gustav Mie, Contributions to the optics of diffuse media, specifically colloidal metallic suspensions, Annalen der Physik, $4^{th}$ series, Vol. 25 (1908) No. 3, pp. 377-445.) Likewise, Lorenz' theory provided an approximation of the electromagnetic wave scattering behavior of sparsely distributed dielectric spheres.

However, both assumptions are not valid for composite materials, which are of practical use as building materials, i.e. have potentially impact on the thermal management of contained spaces. Thus, more advanced models also need consider non-spherical particles or cavities (which are practically the norm), and require the computation of the wavelength-dependent anisotropic scattering behavior of such objects. Moreover, most practical solid materials, or suspensions of particles, which are cast or applied as a liquid or gel and then dried and form a solid, must have high particle densities, which in turn necessitates to consider cascades of multiple scattering among such particles as well as interference effects depending on the material thickness. Realistically, such calculations need to be performed as numerical simulations for sufficient accuracy, but this creates very high computational demands (e.g. at least in part based on Finite-Difference Time Domain solvers for Maxwell's equations).

While such theoretical and numerical methods can provide very helpful guidance for the development of materials with certain spectral qualities, in some cases experimental methods remain to be essential. One such insight is that the overall spectral properties of the material can be far better controlled, if the material consists of a tailored combination of discrete constituents, which contain nano- and/or micro particles of highly distinct size, shape, and electronic configurations.

In few cases will one be able to find natural occurring material, which will have spectral properties that are ideal for a considered application. Thus, by using a tailored mix of nano- and/or micro particles, far better matching of the desired spectral properties of the final material to a target spectrum can be achieved.

Figure 4:
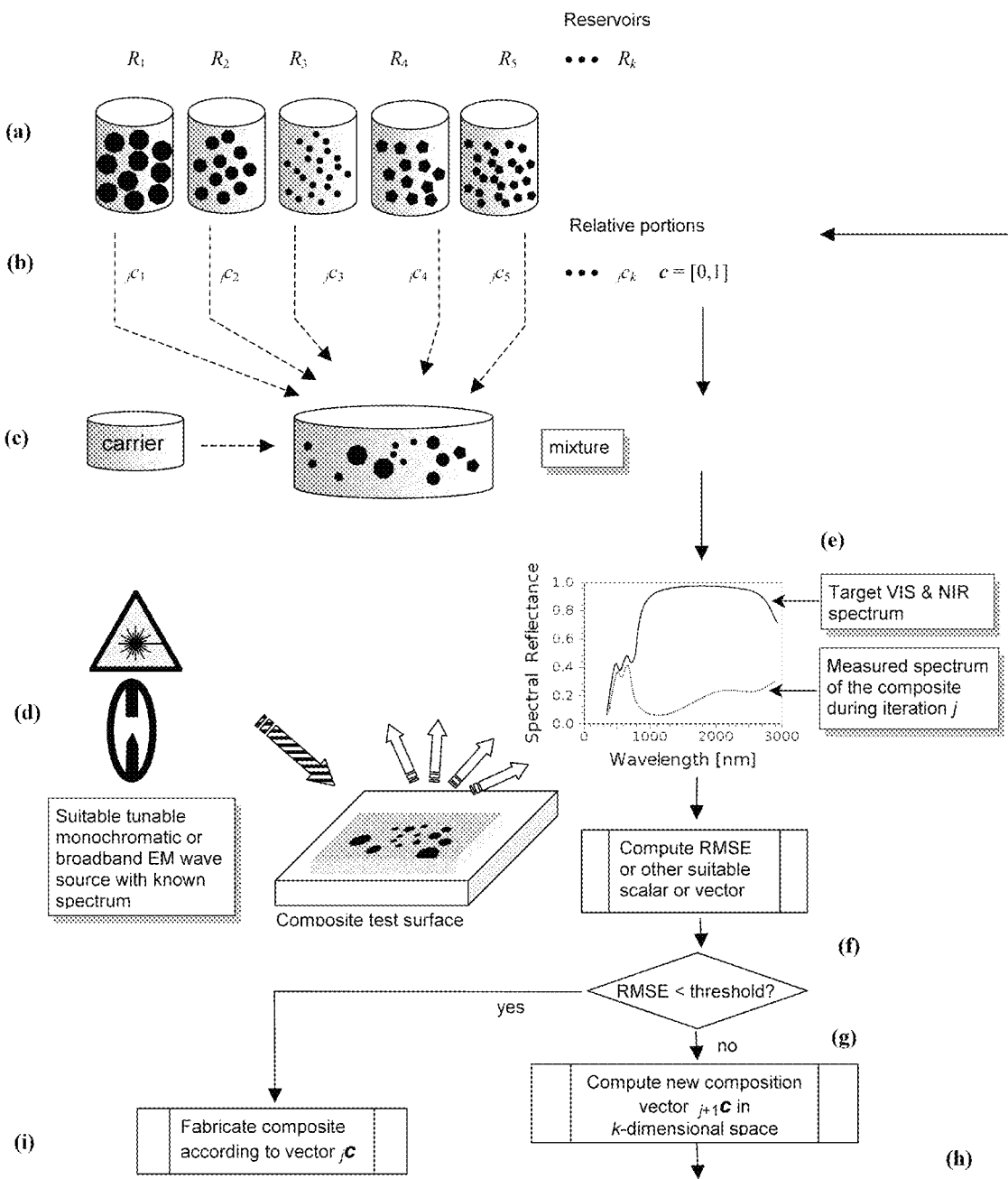
FIG. 4 illustrates simplified and schematically the disclosed method of creating a composite material, which contains a plurality of populations of nano- or micro-particles and/or of nano- or micro-cavities of predominantly distinct size distributions, shape distributions, chemical compositions, crystal structures, and crystallinity distributions, which are predominantly embedded in a carrier material, in such composition ratios, with such typical properties per population, and in such density relative to the carrier material, that a targeted broadband spectral reflectance at least within the VIS and NIR range is achieved.

Yet again, a forward determination of the optimal mix of nano- and/or micro particles to match a given target spectrum is in general difficult if not impossible to obtain. Thus, as illustrated highly simplified and schematically in FIG. 4, the disclosed invention comprises at least the following steps:

a) Preparing a plurality k of reservoirs $R_i$ with i=[1, k], each of which contains nano- or micro-particles of distinct size distribution, shape distribution, chemical composition, crystal structure, and crystallinity distribution. Preferably, these distribution functions are predominantly comprised of a single narrow peak, although multiple peaks may also be acceptable. Of increased importance is consistency.

This desired simplicity of the distribution functions (per reservoir) does not necessarily imply that their spectral properties are simple, but it ensures their consistency, i.e. in a sense the purity of the distributions, which is what enables reliable and repeatable superposition of their spectral properties to produce the targeted spectral properties of the final composite material. This is important since due to the high density of the various nano- or micro-particles the electromagnetic scattering behavior depends on the presence of other particles in the neighborhood of a given particle (i.e., it is not a completely orthogonal superposition).

In some embodiments the nano- or micro-particles for a specific reservoir are directly found in nature but typically have to undergo a rigorous quality assessment (i.e., experimental determination of said distribution functions, chemical composition, and crystallinity) to assure that said distribution functions are maintained.

In some embodiments said nano- or micro-particles for a specific reservoir are selectively filtered from a source of less refined materials, which typically have varying and broad distributions. Again, quality assessment is performed in preferred embodiments in order to assure that said distribution functions are maintained.

In some embodiments said nano- or micro-particles for a specific reservoir are created by one or more chemical processes, which tend to predominantly produce nano- or micro-particles with distinct size distribution, shape distribution, chemical composition, and crystallinity distribution.

In some embodiments said nano- or micro-particles for a specific reservoir are obtained by selectively filtering particles created by one or more chemical processes, which tend to predominantly produce particles with a wide and or varying size distribution, shape distribution, chemical composition, and crystallinity distribution.

In some embodiments said nano- or micro-particles for said various reservoirs come from a combination of said sources.

In some embodiments said nano- or micro-particles from some of said reservoirs will have similar, or even identical chemical composition and shape distribution functions, but may vary in terms of size distribution functions among said subset of reservoirs. For example, there may be reservoirs with particles with typical average sizes of 25 nm, 50 nm, 100 nm, 200 nm and so on.

In some embodiments said nano- or micro-particles from some of said reservoirs will have similar, or even identical chemical composition and size distribution functions, but may vary in terms of shape distribution functions among said subset of reservoirs.

In some embodiments said nano- or micro-particles from some of said reservoirs will have similar, or even identical shape distribution functions and size distribution functions, but may vary in terms of chemical composition or crystallinity among said subset of reservoirs.

In some embodiments the nano- or micro-particles for a specific reservoir typically have to undergo a rigorous quality assessment (i.e., an experimental determination of said distribution functions, chemical composition, and crystallinity) to assure that said distribution functions are maintained.

Corresponding extensions of this principle should now be apparent to those skilled in the art. The goal is to establish preferably wide-spread points in the k-dimensional parameter space, which is conceptually formed by the distinct particle properties of the individual reservoirs. By way of analogy, the reservoirs represent a broadband "color" palette, although, as mentioned, in general a simple linear additive "color" mixing, i.e. spectral mixing, is not possible.

b) Creating a mixture of said nano- or micro-particle based on portions $c_i$ taken from each reservoir $R_i$. Thus, $c_i$ shall denote the relative contribution [0,1] of particles from each reservoir to the final mixture. In many embodiments this may be a relative contribution by mass or by volume. The entire ensemble of all $c_i$ shall subsequently be referred to as the composition vector c.

In some embodiments of the disclosed invention the process of taking the correct amount from each reservoir and mixing these distinct populations of said nano- or micro-particle distributions is performed by suitable, electronically controlled equipment.

c) Mixing, and/or sintering, and/or dispensing and embedding said mixture of said nano- or micro-particle in a chosen carrier material thereby forming what shall be referred to as composite or composite material. In many embodiments the carrier material may initially be liquid or gel-like but will subsequently solidify, for example by evaporation or by an induced chemical process.

d) Forming a solid from said composite, or creating an inhomogeneous solid, a portion of which near its surface predominantly consists of said composite, or applying a sufficiently thick amount of said composite to the surface of another typically predominantly solid material, and the resulting area where the composite is exposed being large enough to conduct the measurements described in the next step.

In some embodiments the predominantly dry particles from the different reservoirs (under step c) only mixed and this mixture is then applied to an at least partially wet bulk material, which subsequently dries at ambient temperature (although this process may create some heat), or is baked, and which thus permanently incorporates said particles at least into its surface region. In some such embodiments to this bulk material may be concrete, clay, porcelain, or other ceramics. In some embodiments some or all of the nano- or micro-particles in the individual reservoir are in a suspension prior to mixing.

e) Determining the broadband spectral properties of the resulting surface.

In some embodiments this will comprise

Exposing the surface to light of predominantly singular wavelength, e.g. by using a light source of predominantly singular wavelength (e.g. a tunable laser, VCEL(s), LED(s)), and/or by using an at least partially broadband light source (including but not limited to arc lamps, incandescent lamps, gas discharge lamps, globars or similar Planck radiators, plasmas, natural solar radiation) and a variable filter, Measurement of the reflectance and/or absorption of the surface, Scanning the wavelength across the wavelength range of interest (at least comprising VIS and NIR), and thus producing the entire reflectance and/or absorption spectrum.

In some embodiments this will comprise

Exposing the surface to broadband EM wave spectrum with spectral composition (at least comprising VIS and NIR) from sources including but not limited to arc lamps, incandescent lamps, gas discharge lamps, globars or similar Planck radiators, plasmas, natural solar radiation, Measurement of the reflectance and/or absorption of the surface with a sensor which can discriminate wavelength or photon energy, and thus producing the entire reflectance and/or absorption spectrum. In both cases additional steps, such as those concerning calibration, comparison with reflected spectra obtained from reference surfaces etc., may be implemented during this step to ensure sufficient accuracy of the obtained spectral data.

In some embodiments the radiation, which is reflected from the produced surface, is measured using a sensor which is positioned within a hollow, highly reflective hemisphere (with certain known spectral characteristics) or a similar configuration, in order to capture both direct and diffuse reflected radiation.

f) Determining the deviation of the thereby obtained reflection or absorption spectrum from a desired target spectrum. In some embodiments this may only be a derived single scalar, such as a root mean square error (RMSE), i.e. the square root of the average squared deltas at each spectral point, which is then provided to the subsequent optimization algorithm.

In some embodiments that quantity may be derived by also using weighting factor for certain spectral regions in order to enhance or suppress the influence of said regions on the subsequent optimization process. In some embodiment the entire "error spectrum" function may be provided to the subsequent optimization algorithm.

g) Having an optimization algorithm determine the composition vector $_{j+1}c$ of a mixture of said nano- or micro-particles based on portions $_{j+1}c_i$ taken from each reservoir $R_i$ during a next iterative step j+1.

The optimization algorithm attempts to find a point in the k-dimensional parameter space, which corresponds to a composition of said mixture of said nano- or micro-particles, which exhibits spectral properties that increasingly better match the desired target spectrum. In some embodiments the optimization strategy may be based on a gradient method, a Monte Carlo method, a genetic optimization algorithms, or other suitable methods, or any combination thereof.

h) Going back to step b) and repeating all subsequent steps until the RMSE value (or a similar quantity, which is a measure for the degree with which the spectrum obtained from the material produced during the last iteration does match the target spectrum) has been reduced below a predetermined threshold.

i) In general, there may be multiple 0-dimensional points or lower dimensional sub-spaces ("islands") within the k-dimensional parameter space, which correspond to different composition vectors c but produce spectra which are similarly well fitting to a given target spectra. Depending on the used optimization algorithm(s), in particular regarding any contained true or pseudo random information sources, repeatedly conducting the described optimization loop may result in similar, or even identical final vectors c or may produce a plurality of different vectors c, which still satisfy the chosen condition of optimality, i.e. the RMSE value or a similar quantity has been reduced below a predetermined threshold.

It shall be mentioned that from a theoretical standpoint the need for using an optimization algorithm arises because determining a suitable composition vector c to produce a material with a sufficiently close match to the desired spectrum is essentially a nonlinear inverse problem, which can in general not be solved directly.

In some embodiments the optimization process may be aided by computational modeling, which attempts to predict the spectral performance of the material produced during the subsequent iteration. In some embodiments it may be sufficient to only rely on such computation models, or at least during some of the optimization steps.

Once the composition vector c for the specific set of reservoirs R (or more specifically the set of particle properties) and the specific target spectrum is determined, the material can be produced in larger quantities.

There are several typical embodiments, which correspond to typical target spectra:

In some embodiments the target is to produce a material with a broadband highly reflective spectrum (e.g., reflectivity close to 1), i.e., a broadband bright white, at least within the VIS and NIR range, or even beyond that. Composite materials with such properties and structural elements made thereof are ideal for unconditionally reducing the amount of absorbed solar radiation, thus reducing the amount converted to thermal energy.

In some such embodiments the target spectral property is extended even beyond the NIR range into the FIR range, which in some such embodiments is targeted to be as black as possible, i.e. the FIR reflectance is as close as possible to zero. Such a composite material will not only minimize the absorption of solar radiation and its conversion to thermal energy, but also exhibit improved performance in terms of radiating gained heat, i.e., cooling off once exposure to direct radiation has stopped.

In some embodiments the target is to produce a composite material with a broadband highly absorbing spectrum, i.e. a broadband black material, at least within the VIS and NIR range. Such a composite material will convert most of the incident radiation into heat. Application may include the inside walls of solar-thermal collectors. In some such applications, in addition to being predominantly VIS and NIR black, the material will also be predominantly black in the FIR, which will cause to exhibit increased radiative thermal losses. In some other such applications, in addition to being predominantly VIS and NIR black, the composite material will also be predominantly white in the FIR, which will cause to exhibit reduced radiative thermal losses, i.e. it will stay warm longer after the exposure to radiation stops or is reduced below a level sufficient to retain its temperature.

In some embodiments the target is to produce a composite material of a specific visual color (i.e. not white), but nevertheless with very high broadband NIR reflectivity, as close as possible to unity. The disclosed invention enables to fabricate such "super-cool" yet visually colored composite materials with far better NIR performance compared to existing solutions. Such materials are suitable to give buildings a desired optical appearance while strongly reducing the amount of absorbed solar radiation, thus reducing the amount of retained thermal energy compared to existing solutions.

In some such embodiments the target is to produce a material of a specific visual color (i.e. not white), with relatively high broadband NIR reflectivity, as well as with relatively low reflectivity in the FIR range. Such material can be made to match a desired visual color, still exhibit relatively decreased heat gain under exposure to solar radiation, and will also comparatively rapidly cool off once exposure to solar radiation seizes.

In some embodiments of the disclosed invention the targeted spectral properties of the material are optimized for exposure to electromagnetic radiation of comparable wavelength but other than solar radiation. Such applications may relate to walls of reaction chambers, turbines, ovens, furnaces, or reactors. In many such applications it is desirable to reduce excessive heating of surfaces and materials.

There are several additional embodiments in terms of the types of used nano- and micro particles although this is not meant to imply any limitations thereon:

In some embodiments, for example, if the target is to produce predominantly broadband highly reflective materials, some of said nano- and micro-particles may consist of barium sulfate $BaSO_4$. In some such embodiments the $BaSO_4$ particles may be derived from finely ground and size-filtered Baryte. In other such preferred embodiments some of said nano- and micro-particles may consist of Kaolinite—$Al_2Si_2O_5(OH)_4$, and/or zinc sulfide—ZnS, and/or Diopside—$MgCa[Si_2O_6]$, and/or Goethite—$\alpha$-$Fe^{3+}$O(OH), and/or Rutile—$TiO_2$ with body-centered tetragonal unit cell, and/or Chrysotile—$Mg_3(Si_2O_5)(OH)_4$, and/or tin dioxide $SnO_2$, and/or Calcite—trigonal $CaCO_3$, and/or hydrated magnesium silicate—monoclinic or triclinic $Mg_3Si_4O_{10}(OH)_2$, and/or calcium sulfate dihydrate—$CaSO_4 \cdot 2H_2O$, and/or titanium dioxide $TiO_2$, and/or aluminum oxide $Al_2O_3$, and/or silicon dioxide $SiO_2$, and/or some sheet silicate minerals including but not limited to Muscovite—$KAl_2(AlSi_3O_{10})(F,OH)_2$, and/or other particles derived from similar minerals or synthesized in to form particles with comparable properties.

There are several additional embodiments in terms of the used embedding material although this is not meant to imply any limitations thereon:

In some embodiments discrete populations of nano- and micro particle mixtures obtained as disclosed above are embedded in carrier material which contains or predominantly contains polytetrafluoroethylene (PTFE) or other fluoropolymer.

In some embodiments discrete populations of nano- and micro particle mixtures obtained as disclosed are embedded in carrier material, which contains or predominantly contains polyamide-imide (incl. based on trimellitic anhydride (TMA) and methylene dianiline (MDA)), polyethersulfone (PES), polyether ether ketone (PEEK), polymethyl-methacrylate (PMMA) or other acrylics, or polyurethanes.

In some embodiments discrete populations of nano- and micro particle mixtures obtained as disclosed are embedded in carrier material, which contains or predominantly contains minerals, and/or clay, and/or cement, cementitious material, or consists predominantly of concrete.

There are several additional embodiments in terms of the fabricated structures, which may be produced according to the disclosed invention:

In some embodiments the disclosed material is part of fabricated structural elements. In some such embodiments concrete, cement, cementitious material, clay, or similar minerals is cast into forms, which have said mixture of particles applied to the wall prior to the casting process, such that said particle mixtures become predominantly embedded to the surface regions of the finished concrete, clay, or ceramic elements. This enables to create surface properties which are resistant to damage, scratching, and aging.

In some embodiments concrete, cement, clay, or other ceramics are cast into forms and said mixtures of particles are applied to the still predominantly wet and exposed surfaces. In some of these embodiments said concrete or clay elements are used to erect houses or other buildings and/or are parts to prefabricated houses. Such houses will have enhanced thermal properties, e.g. offer improved living conditions (in terms of inside temperatures) without or with reduced air-conditioning.

In some embodiments the produced composite materials are used to produce predominantly sheets, plates, tiles, etc., which are mounted on the surface of house, including roofs, and are effectively acting as solar radiation shields.

In some embodiments the disclosed composite material is fabricated as a liquid or gel-like layer with sufficiently strong adhesive properties and which may be applied on already erected buildings or on raw building materials.

The application of the foregoing applies to ceramic, bitumen, asphalt, tarmac, clay, mortar, cement, cementitious material, or concrete tiles, blocks, panels, roof elements, columns, girders, arcs, bricks, sheets, layers, or other elements suitable to erect structures or to be mounted onto or applied to the surface of such structures, including but not limited to for housing, storage, protection, bridges, pavements, runways, or other means to support traffic, or other purposes. In some embodiments discrete populations of nano- and micro particle mixtures obtained as disclosed are embedded in carrier predominantly made of asphalt.

In some embodiments, for example, in case of roofs or roof elements, the produced composite material has arbitrary absorbance in the visible spectrum (400 nm to 700 nm) to choose the visible color, high reflectance in the NIR range to reduce the absorption of solar energy, and high absorbance and in the mid IR and FIR, which enables improved thermal emittance. This FIR property support the relatively rapid loss of heat, e.g. during cloudless the nights.

In some embodiments, for example, in case of walls, the produced composite material has arbitrary absorbance in the visible spectrum (400 nm to 700 nm) to choose the visible color, high reflectance in the NIR range to reduce the absorption of solar energy, as well as high reflectance in the MIR and FIR. Walls are typically exposed to mid and far IR (thermal) radiation predominantly diffusely emitted by surround soil, vegetation, or other building and thus this targeted spectral property reduces heat gain also in this spectral range.

The disclosed method enables in some such embodiments, such as those related to buildings, composite materials, which exhibit what may be referred to as "super-cool" properties due to the much-improved approximation of ideal NIR and FIR properties compared to existing approaches and materials.

In some embodiments the disclosed composite material is applied onto predominantly metallic elements. In some embodiments composite materials with discrete populations of nano- and micro particle mixtures obtained as disclosed above, are applied to the surface of vehicles, including automobiles, busses, or trucks, in order to reduce heat gain while exposed to solar radiation.

In some embodiments composite materials with discrete populations of nano- and micro particle mixtures obtained as disclosed above are applied to the surface of satellites or space craft to reduce heat gain while exposed to solar radiation.

In some embodiment, such as defense-related applications, a goal is not to enhance or reduce heat gain but rather to achieve an improved spectral match of vehicles, buildings, or other structures with the surrounding environment. For example, many military and defense related structures, such as concrete bunkers, garages, or silos etc. are frequently painted with various camouflage patterns and in colors matching the direct environment, in order to make visual detection, both by humans or by suitable detection systems operating in the VIS range, more complicated. However, such concrete structures will still have distinct NIR reflectance spectra (NIR "color") based on their specific composition, which is in general considerably different from surrounding soil or rocks. Thus, detection by aircraft, drone, or satellite based broadband or NIR ("multispectral") long-range imaging systems is relatively easy, since the erected structures provide in general a clear contrast in said wavelength range.

The disclosed method allows to produce composite materials, from which such structures can be made, or which can be applied to or mounted onto the surface of such structures, which spectrally more closely resemble their environment also in the NIR and potentially FIR range. This can delay and complicate said reconnaissance and detection of said structures from aircraft or satellites. In addition, such properties can also result in a better matched thermal behavior.

In some such embodiments a custom-made layer of materials produced according to the disclosed method is produced in the field. In such cases the VIS and NIR spectral properties can be measured directly on the site or in the close vicinity where a bunker or similar structure is built, a material containing said tailored mixtures of nano- and/or micro particles is produced, for example on a vehicle equipped with the required instruments and equipment for this purpose, and applied to the structure. In some embodiments the material may be applied as a relatively thick spray coating. In other embodiments sheets may locally be produced, which are then mounted onto the surface of said structure.

In yet some other related embodiments spectral measurements are taken at various typical sites, where it is expected that structures with such enhanced detection avoidance capabilities may be needed, and then elements for buildings are pre-produced using sets of composite materials, which are spectrally relatively closely matched as disclosed to said sites. In some such embodiments these may be elements predominantly made from concrete. In some other such embodiments these prefabricated sets of composite materials may be claylike materials, which can be applied to concrete structures, which have previously been erected.

In some embodiments composite materials with tailored discrete populations of nano- and micro particle mixtures obtained as disclosed above, are applied to the surface of vehicles, including tanks, troop carriers, trucks, or other combat vehicles in order to achieve an improved spectral matching both in VIS and NIR relative to an environment wherein said vehicles operate, thus complicating and/or delaying ground-, air-, or space-based detection (including homing systems missiles). In some such embodiments the surface of said vehicles is effectively permanently prepared to have certain broadband spectral properties. In some other such embodiments the surface of said vehicles is predominantly temporarily prepared for a relatively short amount of time, typically on the order of hours or days, but well matched to the broadband spectral properties of the environment, which is expected to be subsequently encountered, e.g. based on the terrain, which is to be traversed. In some such embodiments previous ground-, air-, or space-based reconnaissance missions have at least in part obtained the desired target spectra by measuring typical NIR spectra of the terrain, which is to be traversed.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures or preferred embodiments herein.

What is claimed is:

1. A composite material, comprising:
   a plurality of distinct populations of nano- or micro-particles and/or of nano- or micro-cavities, a first population of said plurality of distinct populations comprising one or more of distinct size distributions, shape distributions, chemical compositions, crystal structures, and crystallinity distributions, relative to a second population of said plurality of distinct populations; and
   a carrier material, wherein a mixture of the first population and the second population is in the carrier material, wherein the composite material comprises a selected composition ratio of the first population to the second population, and a selected density of the mixture relative to the carrier material, such that a specific targeted broadband spectral reflectance at least within the visible (VIS) and Near Infrared (NIR) range is approximated as a result of interference effects between at least some of the nano- or micro-particles and/or nano- or micro-cavities of the plurality of distinct populations, wherein the specific targeted broadband spectral reflectance is different from that of each individual population within the plurality of populations and the carrier material.

2. The composite material according to claim 1, wherein said plurality of distinct populations have a spatially constant density distribution throughout the carrier material.

3. The composite material according to claim 1, wherein said plurality of distinct populations have a higher density distribution in regions close to the surface of the composite material compared to the inner regions of the composite material.

4. The composite material according to claim 3, wherein the carrier material is a liquid or gel-like material.

5. A formed layer comprising the composite material according to claim 1; and
a solid material, wherein the composite material is on a surface of the solid material, wherein said composite material comprises a thickness such that opaqueness of said formed layer is achieved at least within the VIS and NIR range.

6. The composite material according to claim 1, comprising a broadband highly reflective spectrum within the VIS and NIR range.

7. The composite material according to claim 6, comprising a broadband highly reflective spectrum within the Ultraviolet (UV), VIS and NIR range.

8. The composite material according to claim 6, comprising a broadband highly reflective spectrum within the VIS and NIR range, and a highly absorbing spectrum in the Mid Infrared (MIR) range.

9. The composite material according to claim 8, comprising a broadband highly reflective spectrum within the VIS and NIR range, and a highly absorbing spectrum in the MIR and Far Infrared (FIR) range.

10. A closed structure comprising a surface, wherein the composite material of claim 8 is positioned on the surface to reduce the amount of incident electromagnetic radiation which is converted to thermal energy and heat gain inside said structure, and to enhance thermal emittance.

11. An open structure comprising a surface, wherein the composite material of claim 6 is positioned on the surface to reduce the amount of incident electromagnetic radiation which is converted to thermal energy.

12. A closed structure comprising a surface, wherein the composite material of claim 6 is positioned on the surface to reduce the amount of incident electromagnetic radiation which is converted to thermal energy and heat gain inside said structure.

13. A building comprising a surface, the composite material of claim 6 on the surface to reduce the amount of solar radiation which is converted to thermal energy and heat gain inside said building.

14. The composite material according to claim 1, comprising a specific targeted broadband spectral reflectance with a specific chosen reflective spectrum within the VIS range and a broadband highly reflective spectrum in the NIR range.

15. The composite material according to claim 14, comprising a specific targeted broadband spectral reflectance with a specific chosen reflective spectrum within the VIS range and a broadband highly reflective spectrum in the UV and NIR range.

16. The composite material according to claim 14, further comprising a specific targeted broadband spectral reflectance with a specific chosen reflective spectrum within the VIS range and a broadband highly reflective spectrum in the NIR range and a broadband highly absorbing spectrum in the MIR range.

17. A closed structure comprising a surface, wherein the composite material of claim 16 is on the surface and configured to give the surface a certain visual color, and to reduce the amount of electromagnetic radiation which is converted to thermal energy and heat gain inside said structure, and to enhance thermal emittance.

18. A building comprising a surface, wherein the composite material of claim 16 is on the surface and configured to give the surface a certain visual color, and to reduce the amount of solar radiation which is converted to thermal energy and heat gain inside the building, and to enhance thermal emittance and thermal energy loss at night.

19. A closed structure comprising a surface, wherein the composite material of claim 14 is on the surface and configured to give the surface a certain visual color and to reduce the amount of solar radiation which is converted to thermal energy and heat gain inside said structure.

20. A building comprising a surface, wherein the composite material of claim 14 is on the surface and configured to give the surface a certain visual color and to reduce the amount of solar radiation which is converted to thermal energy and heat gain inside the building.

21. The composite material according to claim 1, wherein the carrier material comprises at least one of minerals, clay, cement, cementitious material, and concrete.

22. The composite material according to claim 1, wherein the carrier material comprises polymers.

23. A structure comprising a surface, wherein the composite material of claim 1 is on the surface, and configured to achieve a closer spectral match with the environment at least within the VIS and NIR range, relative to a structure without the composite material.

24. A building or vehicle comprising a surface, wherein the composite material of claim 1 is on the surface, and configured to achieve a closer spectral match with the environment, and thereby reducing detectability at least within the NIR range, relative to a building or vehicle without the composite material.

25. A system comprising the composite material according to claim 1, further comprising:
a plurality of reservoirs with i defined as an integer ranging from 1 to k, corresponding to said plurality of distinct populations of nano- or micro-particles and/or of nano- or micro-cavities;
an electronic controller configured to determine the composition ratio of said plurality of populations of nano- or micro-particles and/or of nano- or micro-cavities via an experimental optimization loop comprising at least the following steps:
A) creating a mixture of said populations of nano- or micro-particles and/or nano- or micro-cavities based on taking portions $c_i$ from each reservoir $R_i$, wherein $c_i$ shall denote the relative contribution of nano- or micro-particles and/or nano- or micro-cavities from each corresponding reservoir $R_i$ to the mixture, thus all scalars $c_i$ forming a composition vector denoted c, B) embedding said mixture of said nano- or micro-particles and/or nano- or micro-cavities in the carrier material thereby creating the composite material, C) using an amount of said composite material to determine a broadband spectral reflectance of the composite material at least within VIS and NIR, and D) determining a quantity, which is a measure for the degree with which the broadband spectral reflectance of the composite material produced during step B does match the specific targeted broadband spectral reflectance, E) determining if a predetermined threshold of said quantity has been reached, wherein the predetermined threshold measures the degree with which the broadband spectral reflectance of the composite material produced during step B does match the specific targeted broadband spectral reflectance, and:

E(1) if said threshold is not reached, having an optimization algorithm determine a Previously Presented composition vector $_{j+1}c$ of the mixture of said nano- or micro-particles and/or nano- or micro-cavities based on portions $_{j+1}ci$ taken from each reservoir $R_i$ during a next iterative step j+1 and continuing the iteration of the optimization loop at step A; and E(2) if said threshold is reached or surpassed, producing larger quantities of said composite material for subsequent use.

26. A system comprising the composite material according to claim 1, further comprising:

a computing device configured to determine the composition ratio of said plurality of distinct populations of nano- or micro-particles and/or of nano- or micro-cavities by performing an optimization loop based on computational modeling to determine the spectral performance of the composite material within the VIS and NIR range.

* * * * *

UNITED STATES PATENT AND TRADEMARK OFFICE
CERTIFICATE OF CORRECTION

PATENT NO. : 10,633,869 B2  
APPLICATION NO. : 16/387206  
DATED : April 28, 2020  
INVENTOR(S) : Andreas Hieke et al.

Page 1 of 1

It is certified that error appears in the above-identified patent and that said Letters Patent is hereby corrected as shown below:

In the Specification

In Column 5, Line 40, delete "and or" and insert --and/or--.

In Column 6, Line 23, delete "εr," and insert --$\varepsilon_r$,--.

In Column 6, Line 24, delete "n=(εr.μr)$^{0.5}$." and insert --n=$(\varepsilon_r.\mu_r)^{0.5}$.--.

In Column 6, Line 27, delete "n≈εr$^{0.5}$." and insert --n≈$\varepsilon_r^{0.5}$.--.

In Column 8, Line 9, delete "and or" and insert --and/or--.

In Column 9, Line 32, delete "VCEL(s)," and insert --VCSEL(s),--.

In the Claims

In Column 18, Line 5, Claim 25, delete "$_{j+1}$ci" and insert --$_{j+1}c_i$--.

Signed and Sealed this  
Fifteenth Day of September, 2020

Andrei Iancu  
*Director of the United States Patent and Trademark Office*